US009519179B2

(12) United States Patent
Han et al.

(10) Patent No.: US 9,519,179 B2
(45) Date of Patent: Dec. 13, 2016

(54) COLOR FILTER SUBSTRATE HAVING RESISTANCE-REDUCED COMMON ELECTRODE AND LIQUID CRYSTAL DISPLAY PANEL MADE THEREFROM

(71) Applicant: Shenzhen China Star Optoelectronics Technology Co., Ltd., Shenzhen, Guangdong (CN)

(72) Inventors: Bing Han, Shenzhen (CN); Shih-hsun Lo, Shenzhen (CN); Zuomin Liao, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 330 days.

(21) Appl. No.: 13/985,289

(22) PCT Filed: Jun. 28, 2013

(86) PCT No.: PCT/CN2013/078278
§ 371 (c)(1),
(2) Date: Aug. 14, 2013

(87) PCT Pub. No.: WO2014/187014
PCT Pub. Date: Nov. 27, 2014

(65) Prior Publication Data
US 2014/0347610 A1  Nov. 27, 2014

(30) Foreign Application Priority Data

May 24, 2013  (CN) .......................... 2013 1 0198398

(51) Int. Cl.
G02F 1/1335 (2006.01)
G02F 1/1343 (2006.01)
(Continued)

(52) U.S. Cl.
CPC ......... *G02F 1/133512* (2013.01); *G02B 5/201* (2013.01); *G02F 1/1343* (2013.01); *G02F 1/133514* (2013.01); *G02F 2201/121* (2013.01)

(58) Field of Classification Search
CPC combination set(s) only.
See application file for complete search history.

(56) References Cited

U.S. PATENT DOCUMENTS

2006/0232729 A1* 10/2006 Rho .................. G02F 1/133512
349/106
2009/0122240 A1* 5/2009 Lim .................. G02F 1/133512
349/106
(Continued)

FOREIGN PATENT DOCUMENTS

CN  101013174 A  8/2007
CN  101329465 A  12/2008

*Primary Examiner* — Lauren Nguyen
(74) *Attorney, Agent, or Firm* — Andrew C. Cheng

(57) ABSTRACT

The present invention discloses a color filter substrate and a liquid crystal panel. The color filter substrate includes a substrate a transparent conductive film, a black array, and an auxiliary conductive layer. Wherein the black array is arranged on the substrate and the transparent conductive film is disposed on the black array. Wherein the auxiliary conductive layer is disposed over a surface of the substrate facing the black array, and has at least portions arranged between the substrate and the black array. By these arrangements, the present invention can effectively reduce the brightness interference of the liquid crystal panel, while increasing the adhesion of the auxiliary conductive layer in addition, this arrangement can effectively avoid the damage to the transparent conductive film by the auxiliary conductive layer.

12 Claims, 2 Drawing Sheets

(51) Int. Cl.
    *G02F 7/00*    (2006.01)
    *G02B 5/20*    (2006.01)

(56) References Cited

U.S. PATENT DOCUMENTS

| | | | |
|---|---|---|---|
| 2010/0026951 A1* | 2/2010 | Chiang | G02F 1/13452 349/150 |
| 2011/0013126 A1* | 1/2011 | Wang | G02F 1/133555 349/106 |
| 2011/0080542 A1* | 4/2011 | Huang | G02F 1/136209 349/106 |
| 2011/0304526 A1* | 12/2011 | Itoh | G02F 1/133711 345/87 |

* cited by examiner

COLOR FILTER SUBSTRATE HAVING RESISTANCE-REDUCED COMMON ELECTRODE AND LIQUID CRYSTAL DISPLAY PANEL MADE THEREFROM

FIELD OF THE INVENTION

The present invention relates to a technical field of liquid crystal display, and more particularly, to a color filter substrate and a liquid crystal display panel made therefrom.

DESCRIPTION OF PRIOR ART

With the development of the display technology, the liquid crystal display has become the main trend as it is featured with high displaying quality, low energy consumption, radiation, and high performance.

The liquid crystal panel is a key component of the liquid crystal display, and the panel generally includes an array substrate, a color filter substrate, and a liquid crystal stuffed between the array substrate and the color substrate. The color filter substrate is arranged with a transparent conductive film, and the array substrate is also provided with a pixel transparent conductive film, the brightness and dimmer of the pixel is jointly controlled by the transparent conductive film of the color filter substrate and the pixel transparent conductive film of the array substrate. However, the resistance of the transparent conductive film of the color filter substrate is too large such that it creates an unbalance of the brightness. Furthermore, an issue of brightness interference will also be created.

SUMMARY OF THE INVENTION

It is an object of the present invention to provide a color filter substrate and a liquid crystal panel so as to resolve the technical problem encountered by the prior art. While the present invention can effectively reduce the brightness interference of the liquid crystal panel, while increasing the adhesion of the auxiliary conductive layer. In addition, this arrangement can effectively avoid the damage to the transparent conductive film by the auxiliary conductive layer.

In order to resolve the technical problems, the present invention provides a solution by introducing a color filter substrate including a substrate, a transparent conductive film, a black array, and an auxiliary conductive layer; wherein the black array is arranged between the substrate and the transparent conductive film wherein the auxiliary conductive layer is disposed over a surface of the substrate facing the black array, and the auxiliary conductive layer is created by sputter deposition of metal across the surface of the substrate; wherein the black array is defined with through holes; and wherein the transparent conductive film is provided with embossments disposed within the holes of the black array therefore creating, an ohm contact.

Wherein the metal includes one of copper, aluminum, molybdenum, zinc or silver or any alloy thereof.

In order to resolve the technical problems, the present invention provides a solution by introducing a color filter substrate including a substrate, a transparent conductive film, a black array, and an auxiliary conductive layer; wherein the black array is arranged between the substrate and the transparent conductive film wherein the auxiliary conductive layer is disposed over a surface of the substrate facing the black array, and having at least portions arranged between the substrate and the black array; and wherein the auxiliary conductive layer is electrically in contact with the transparent conductive film.

Wherein the black array is defined with holes, and the transparent conductive film is provided with embossments which are disposed within the holes so as to create an ohm contact to the auxiliary conductive layer.

Wherein the black array is defined with holes, and the auxiliary conductive layer is provided with embossments which are disposed within the holes so as to create an ohm contact to the transparent conductive film.

Wherein the auxiliary conductive layer is made from metal.

Wherein the metal includes one of copper, aluminum, molybdenum, zinc or silver or any alloy thereof.

In order to resolve the technical problems, the present invention provides a solution by introducing a liquid crystal panel including an array substrate, a liquid crystal layer, and a color filter substrate; wherein the color filter substrate includes a substrate, a transparent conductive film, a black array, and an auxiliary conductive layer; wherein the black array is arranged between the substrate and the transparent conductive film; wherein the auxiliary conductive layer is disposed over a surface of the substrate facing the black array, and having at least portions arranged between the substrate and the black array, wherein the auxiliary conductive layer is electrically in contact with the transparent conductive film; and wherein the auxiliary conductive layer is electrically in contact with the transparent conductive film.

Wherein the black array is defined with holes, and the transparent conductive film is provided with embossments which are disposed within the holes so as to create an ohm contact to the auxiliary conductive layer.

Wherein the black array is defined with holes, and the auxiliary conductive layer is provided with embossments which are disposed within the holes so as to create an ohm contact to the transparent conductive film.

Wherein the auxiliary conductive layer is made from metal.

Wherein the metal includes one of copper, aluminum, molybdenum, zinc or silver or any alloy thereof.

The present invention can be concluded with the following advantages. As compared to the existing prior art, an auxiliary conductive layer is formed on a surface of the substrate of the color filter film facing the black array so as to avoid corrosion from the auxiliary conductive layer to the transparent conductive film when the auxiliary conductive layer is created. Since the transparent conductive film is comparatively thin, and it can be easily damaged during the corrosive activities. On the other hand, the material used to make the substrate is silicon oxide, while the auxiliary conductive layer is metallic material. The bonding between the metallic material and the silicon oxide is even stronger, and this will help the formation of the auxiliary conductive layer over the substrate, and also increase the adhesion of the auxiliary conductive layer. As the auxiliary conductive layer and the transparent conductive film are electrically interconnected, and the original common electrode configured singly by the transparent conductive film will be transformed to be configured by both the auxiliary conductive layer and the transparent conductive film. As a result, the resistance of the common electrode can be effectively lowered so as to even the brightness of the panel and reduce the brightness interference of the panel.

DETAILED DESCRIPTION OF PREFERRED EMBODIMENTS

Figure 1:
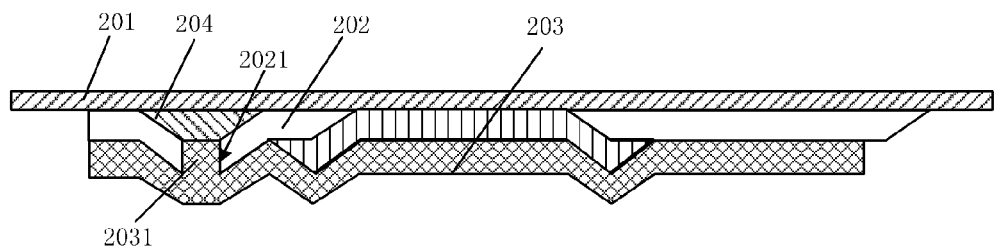
FIG. 1 is a configurational illustration of a color filter substrate made in accordance with the present invention.

Referring to FIG. 1, which is a configurational illustration of a color filter substrate made in accordance with the present invention. As shown, the color filter substrate 20 includes a substrate 20, a black array 202, a transparent conductive film 203, and an auxiliary conductive layer 204.

The black array 202 is disposed between the substrate 201 and the transparent conductive film 203. The auxiliary conductive layer 204 is formed on a surface of the substrate 201 facing toward a surface of the black array 202 and at least a portion thereof is arranged between the substrate 201 and the black array 202, in a preferable embodiment of the present invention, the auxiliary conductive layer 204 is made form copper, aluminum, molybdenum, zinc or silver or any alloy thereof. The auxiliary conductive layer 204 is formed by deploying metallic layer over the substrate 201 by way of sputter deposition. Since the substrate 201 is main made from silicon oxide, and the bonding between the metal and the silicon oxide is comparably better. In comparison to have the auxiliary conductive layer 204 attached to the black array 202 or attached to the transparent conductive, film 204, the attachment of the auxiliary conductive layer 204 attached to the substrate 201 demonstrates a stronger bonding performance such that the auxiliary conductive layer 204 will not easily peeled of therefrom. On the other hand, if the auxiliary conductive layer 204 is going to deploy over the transparent conductive film 203 through sputter deposition, an etching solution is required. The etching solution will exert a corrosive action during, the deployment. Since the transparent conductive film 203 is comparably thinner, and it can be readily damaged by the etching solution. However, the thickness of the substrate 201 is much thicker, and the etching solution has less etching activity to the substrate 201.

On the other hand, if the metallic layer is deployed over the transparent conductive film 203 so as to create the auxiliary conductive layer 204 by means of sputter deposition, then the etching solution is needed, and which will inevitably create some corrosive activities over the transparent conductive film 203. However, since the transparent conductive film 203 is comparably thinner, and it can be readily damaged by the etching solution, while the thickness of the substrate 201 is much thicker, and the etching solution has less etching influence to the substrate 201.

The auxiliary conductive layer 204 and the transparent conductive film 203 are electrically interconnected, and wherein the auxiliary transparent layer 204 has a stronger conductivity as it has lower resistance. Accordingly, the original common electrode configured singly by the transparent conductive film 203 will be transformed to be configured by both the auxiliary conductive layer 204 and the transparent conductive film 203. As a result, the resistance of the common electrode can be effectively lowered so as to even the brightness of the panel and reduce the brightness interference of the panel. It should be noted that accordingly to the preferred embodiment of the present invention, even the auxiliary conductive layer 204 is arranged within an area under the shadow of the black array 202, it can be arranged such that it is located outside of the shadow of the black array 202. It can be arranged that it is disposed outside of the shadow of the black array 202 as long as the electrical interconnection between the auxiliary conductive layer 204 and the transparent conductive film 203 is established so as to fulfill the purpose of lowering the resistance.

According to one of the embodiments, the black array 202 is defined with holes 2021, and the transparent conductive film 203 is provided with embossments 2031 which passing through the holes 2021 so as to create an ohm contact with the auxiliary conductive layer 204. By this arrangement, electrical interconnection between the auxiliary conductive layer 204 and the transparent conductive film 203 is established.

Figure 2:
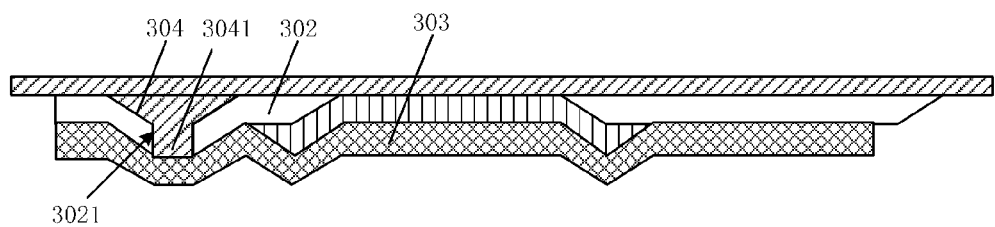
FIG. 2 is a configurational illustration showing the establishment of an electrical interconnection between an auxiliary conductive layer and a transparent conductive film made in accordance with the color filter substrate of the present invention.

According to another embodiment of the present invention such as shown in FIG. 2, the black array 202 is also defined with holes 3021, while the auxiliary conductive layer 304 is formed with embossments 3041 which are disposed within the holes 3021 so as to establish an ohm contact with respect to the transparent conductive, film 303, and the electrical interconnection between the auxiliary conductive layer 304 and the transparent conductive film 303 is established.

In the current embodiment, the auxiliary conductive layer 204 is formed on the surface of the substrate 201 of the color filter substrate 20 facing toward the black array 202 so as to prevent the damage to the transparent conductive film 203 when the auxiliary conductive layer 204 is formed over the transparent conductive film 203 because of the etching activity. Since the transparent conductive film 203 is much thinner and is vulnerably to be damaged under the etching activity. By way of the present invention, the transparent conductive film 203 is well protected. On the other hand, the substrate 201 is generally made from silicon oxide and the auxiliary conductive layer 204 has a better bonding with the silicon oxide. As compared to the bonding between the auxiliary conductive layer 204 and the black array 202 or to the transparent conductive layer 203, the bonding between the auxiliary conductive layer 203 and the substrate 201 is much stronger, and thereby increasing the bonding adhesion of the auxiliary conductive layer 204 to the substrate 201. The auxiliary conductive layer 204 is electrically interconnected with the transparent conductive film 203 such that the common electrode originally solely configured by the transparent conductive film 203 is not changed to be configured by both the auxiliary conductive layer 204 and the transparent conductive film 203. By way of this arrangement, the resistance of the common electrode is effectively reduced, and the brightness of the display becomes even more homogeneous, and the brightness interference is also reduced.

Figure 3:
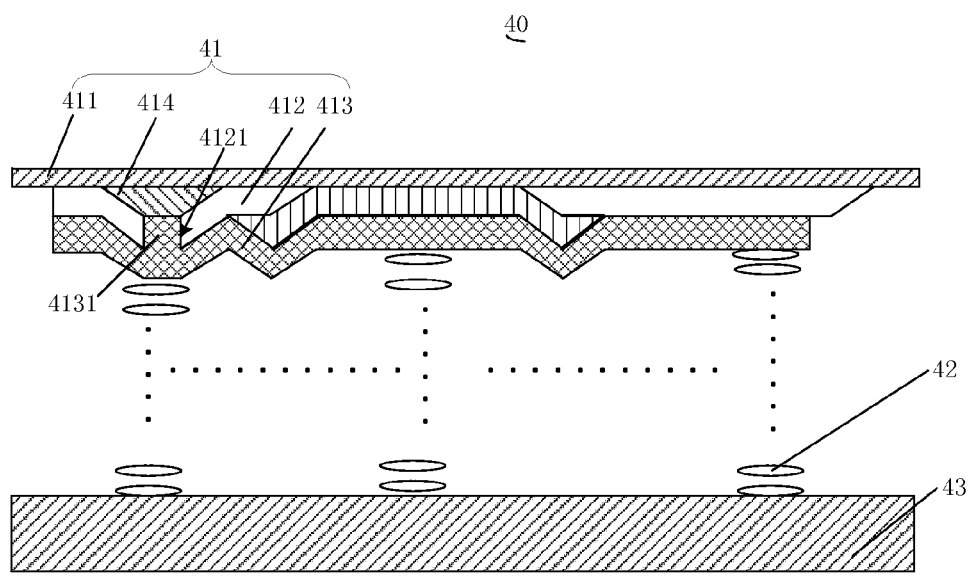
FIG. 3 is a configurational illustration of a liquid crystal panel made in accordance with the present invention.

Referring to FIG. 3, which is a configurational illustration of a liquid crystal panel made in accordance with the present invention. As shown in FIG. 3, the liquid crystal display panel 40 includes a color filter film 41, a liquid crystal layer 42, and an array substrate 43. The color filter substrate 41 includes a substrate 411, a black array 412, a transparent conductive film 413, and an auxiliary conductive layer 414.

The black array 412 is disposed between the substrate 411 and the transparent conductive film 413. The auxiliary conductive layer 4144 is formed on a surface of the substrate 411 facing toward a surface of the black array 412 and at least a portion thereof is arranged between the substrate 411 and the black array 412. In a preferable embodiment of the present invention, the auxiliary conductive layer 414 is made form copper, aluminum, molybdenum, zinc or silver or any alloy thereof. The auxiliary conductive layer 414 is formed by deploying metallic layer over the substrate 411 by way of sputter deposition. Since the substrate 411 is main made from silicon oxide, and the bonding between the metal and the silicon oxide is comparably better. In comparison to have the auxiliary conductive layer 414 attached to the black array 412 or attached to the transparent conductive film 414, the attachment of the auxiliary conductive layer 414 attached to the substrate 411 demonstrates a stronger bonding performance such that the auxiliary conductive layer 414 will not easily peeled of therefrom. On the other hand, if the auxiliary conductive layer 414 is going to deploy over the transparent conductive film 413 through sputter deposition, an etching solution is required. The etching solution will exert a corrosive action during the deployment. Since the transparent conductive film 413 is comparably thinner, and it can be readily damaged by the etching solution. However, the thickness of the substrate 411 is much thicker, and the etching solution has less etching influence to the substrate 411.

The auxiliary conductive layer 414 and the transparent conductive film 413 are electrically interconnected, and wherein the auxiliary transparent layer 414 has a stronger conductivity as it has lower resistance. Accordingly, the original common electrode configured singly by the transparent conductive film 413 will be transformed to be configured by both the auxiliary conductive layer 414 and the transparent conductive film 413. As a result, the resistance of the common electrode can be effectively lowered so as to even the brightness of the panel and reduce the brightness interference of the panel. It should be noted that accordingly to the preferred embodiment of the present invention, even the auxiliary conductive layer 414 is arranged within an area under the shadow of the black array 412, it can be arranged such that it is located outside of the shadow of the black array 412. It can be arranged that it is disposed outside of the shadow of the black array 412 as long as the electrical interconnection between the auxiliary conductive layer 414 and the transparent conductive film 413 is established so as to fulfill the purpose of lowering the resistance.

According to one of the embodiments, the black array 412 is defined with holes 4121, and the transparent conductive film 413 is provided with embossments 4131 which passing through the holes 4121 so as to create an ohm contact with the auxiliary conductive layer 414. By this arrangement, electrical interconnection between the auxiliary conductive layer 414 and the transparent conductive film 413 is established.

Figure 4:
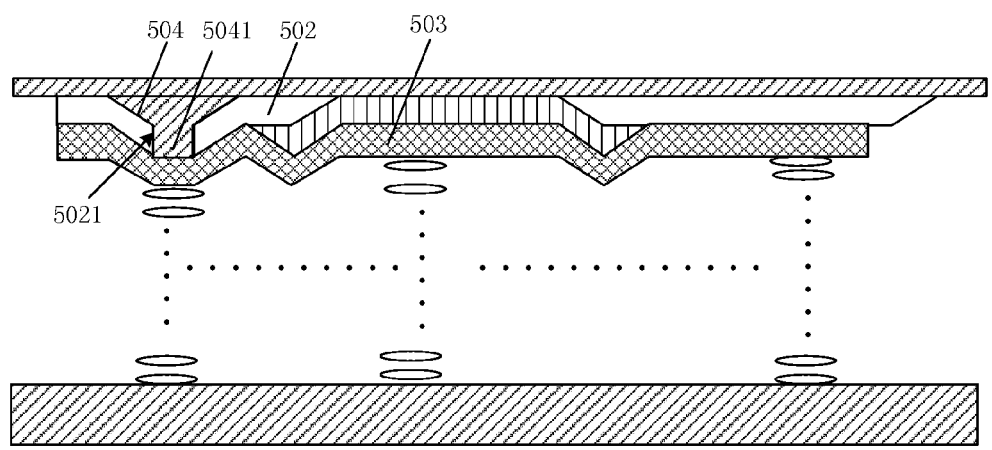
FIG. 4 is a configurational illustration showing the establishment of an electrical interconnection between an auxiliary conductive layer and a transparent conductive film made in accordance with the liquid crystal panel of the present invention.

According to another embodiment of the present invention such as shown in FIG. 4, the black array 502 is also defined with holes 5021, while the auxiliary conductive layer 504 is formed with embossments 5041 which are disposed within the holes 5021 so as to establish an ohm contact with respect to the transparent conductive film 503, and the electrical interconnection between the auxiliary conductive layer 504 and the transparent conductive film 503 is established The liquid crystal layer 42 is arranged between the transparent conductive film 503 and the array substrate 43.

In the current embodiment, the auxiliary conductive layer 414 is formed on the surface of the substrate 411 of the color filter substrate 41 of the liquid crystal panel 40 facing toward the black array 412 so as to prevent the damage to the transparent conductive film 413 when the auxiliary conductive layer 414 is formed over the transparent conductive film 413 because of the etching activity. Since the transparent conductive film 413 is much thinner and is vulnerably to be damaged under the etching activity. By way of the present invention, the transparent conductive film 413 is well protected. On the other hand, the substrate 411 is generally made from silicon oxide and the auxiliary conductive layer 414 has a better bonding with the silicon oxide. As compared to the bonding between the auxiliary conductive layer 414 and the black array 412 or to the transparent conductive layer 413, the bonding between the auxiliary conductive layer 413 and the substrate 411 is much stronger, and thereby increasing the bonding adhesion of the auxiliary conductive layer 414 to the substrate 411. The auxiliary conductive layer 414 is electrically interconnected with the transparent conductive film 413 such that the common electrode originally solely configured by the transparent conductive film 413 is not changed to be configured by both the auxiliary conductive layer 414 and the transparent conductive film 413. By way of this arrangement, the resistance of the common electrode is effectively reduced, and the brightness of the display becomes even more homogeneous, and the brightness interference is also reduced.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A color filter substrate including a substrate, a transparent conductive film formed of a first conductive material exhibiting a first electrical resistance, a black array, and an auxiliary conductive layer formed of a second conductive material different from the first conductive material and exhibiting a second electrical resistance that is lower than the first electrical resistance of the transparent conductive film;

wherein the black array is arranged between the substrate and the transparent conductive film;

wherein the auxiliary conductive layer is disposed directly on a surface of the substrate facing the black array and is located in an area under a shadow of the black array on the surface of the substrate, and the auxiliary conductive layer is created by sputter deposition of a metal on the surface of the substrate;

wherein the black array is defined with through holes; and wherein the transparent conductive film is provided with embossments disposed within the holes of the black array therefore creating an ohm contact with auxiliary conductive layer so as to establish electrical interconnection between the transparent conductive film and the auxiliary conductive layer and combine the transparent conductive film and the auxiliary conductive layer together in such a way that the combination of the transparent conductive film and the auxiliary conductive layer exhibits an electrical resistance that is lower than the first electrical resistance of the transparent conductive film so that the transparent conductive film and the auxiliary conductive layer are respectively on opposite sides of the black array and collectively form a common electrode of the color filter substrate for transmission of an electrical signal and the common electrode has an effective resistance against the transmission of the electrical signal is lower than the first electrical resistance against the electrical signal transmitting through the transparent conductive film and the second electrical resistance against the electrical signal transmitting through the auxiliary conductive layer.

2. The color filter substrate as recited in claim 1, wherein the metal includes one of copper, aluminum, molybdenum, zinc or silver or any alloy thereof.

3. A color filter substrate including a substrate, a transparent conductive film formed of a first conductive material exhibiting a first electrical resistance, a black array, and an auxiliary conductive layer formed of a second conductive material different from the first conductive material and exhibiting a second electrical resistance that is lower than the first electrical resistance of the transparent conductive film;
   wherein the black array is arranged between the substrate and the transparent conductive film;
   wherein the auxiliary conductive layer is disposed directly on a surface of the substrate facing the black array, and arranged between the substrate and the black array and located in an area under a shadow of the black array on the surface of the substrate; and
   wherein the auxiliary conductive layer is electrically in contact with the transparent conductive film so as to establish electrical interconnection between the transparent conductive film and the auxiliary conductive layer and combine the transparent conductive film and the auxiliary conductive layer together in such a way that the combination of the transparent conductive film and the auxiliary conductive layer exhibits an electrical resistance that is lower than the first electrical resistance of the transparent conductive film so that the transparent conductive film and the auxiliary conductive layer are respectively on opposite sides of the black array and collectively form a common electrode of the color filter substrate for transmission of an electrical signal and the common electrode has an effective resistance against the transmission of the electrical signal is lower than the first electrical resistance against the electrical signal transmitting through the transparent conductive film and the second electrical resistance against the electrical signal transmitting through the auxiliary conductive layer.

4. The color filter substrate as recited in claim 3, wherein the black array is defined with holes, and the transparent conductive film is provided with embossments which are disposed within the holes so as to create an ohm contact to the auxiliary conductive layer.

5. The color filter substrate as recited in claim 3, wherein the black array is defined with holes, and the auxiliary conductive layer is provided with embossments which are disposed within the holes so as to create an ohm contact to the transparent conductive film.

6. The color filter substrate as recited in claim 3, wherein the auxiliary conductive layer is made of a metal.

7. The color filter substrate as recited in claim 6, the metal includes one of aluminum, molybdenum, zinc or silver or any alloy thereof.

8. A liquid crystal panel including an array substrate, a liquid crystal layer, and a color filter substrate;
   wherein the color filter substrate includes a substrate, a transparent conductive film formed of a first conductive material exhibiting a first electrical resistance, a black array, and an auxiliary conductive layer formed of a second conductive material that is different from the first conductive material and exhibiting a second electrical resistance that is lower than the first electrical resistance of the transparent conductive film;
   wherein the black array is arranged between the substrate and the transparent film;
   wherein the auxiliary conductive layer is disposed directly on a surface of the substrate facing the black array, and arranged between the substrate and the black array and located under a shadow of the black array on the surface of the substrate, wherein the auxiliary conductive layer is electrically in contact with the transparent conductive film so as to establish electrical interconnection between the transparent conductive film and the auxiliary conductive layer and combine the transparent conductive film and the auxiliary conductive layer together in such a way that the combination of the transparent conductive film and the auxiliary conductive layer exhibits an electrical resistance that is lower than the first electrical resistance of the transparent conductive film so that the transparent conductive film and the auxiliary conductive layer are respectively on opposite sides of the black array and collectively form a common electrode of the color filter substrate for transmission of an electrical signal and the common electrode has an effective resistance against the transmission of the electrical signal is lower than the first electrical resistance against the electrical signal transmitting through the transparent conductive film and the second electrical resistance against the electrical signal transmitting through the auxiliary conductive layer; and
   wherein the liquid crystal layer is arranged between the transparent conductive film and the array substrate.

9. The liquid crystal panel as recited in claim 8, wherein the black array is defined with holes, and the transparent conductive film is provided with embossments which are within the holes so as to create an ohm contact to the auxiliary conductive layer.

10. The color filter substrate as recited in claim 8, wherein the black array is defined with holes, and the auxiliary conductive layer is provided with embossments which are disposed within the holes so as to create an ohm contact to the transparent conductive film.

11. The liquid crystal panel as recited in claim 8, wherein the auxiliary conductive layer is made of a metal.

12. The liquid crystal panel as recited in claim 11, wherein the metal includes one of aluminum, molybdenum, zinc or silver or any alloy thereof.

* * * * *